(12) United States Patent
Takahashi et al.

(10) Patent No.: US 7,116,835 B2
(45) Date of Patent: Oct. 3, 2006

(54) IMAGE PROCESSING APPARATUS AND METHOD, RECORDING MEDIUM, AND PROGRAM

(75) Inventors: Kuniaki Takahashi, Kanagawa (JP); Kazushi Sato, Chiba (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 10/196,259

(22) Filed: Jul. 17, 2002

(65) Prior Publication Data

US 2003/0067979 A1 Apr. 10, 2003

(30) Foreign Application Priority Data

Jul. 23, 2001 (JP) ............................ P2001-221674

(51) Int. Cl.
*G06K 9/36* (2006.01)
*G06K 9/46* (2006.01)
*H04N 7/12* (2006.01)

(52) U.S. Cl. .................. 382/251; 382/239; 375/240.03
(58) Field of Classification Search ................ 382/251, 382/239; 375/240.02, 240.03, 240.04
See application file for complete search history.

(56) References Cited

U.S. PATENT DOCUMENTS 5,822,461 A * 10/1998 Choi .......................... 382/250
6,480,539 B1 * 11/2002 Ramaswamy .......... 375/240.03
6,687,296 B1 * 2/2004 Sato et al. .............. 375/240.12

* cited by examiner

*Primary Examiner*—Vikkram Bali
*Assistant Examiner*—Colin LaRose
(74) *Attorney, Agent, or Firm*—Rader, Fishman & Grauer PLLC; Ronald P. Kananen

(57) ABSTRACT

A normalized activity calculating unit calculates a normalized activity that is calculated from luminescence component pixel values of an original image on the basis of information from an information buffer, such as bit rate, an amount of bits generated in each frame, and an amount of bits generated and a quantization step size in each macroblock. The normalized activity calculating unit then outputs the normalized activity to a code amount control unit. The code amount control unit calculates a quantization scale code corresponding to a target bit rate, which quantization scale code matches visual characteristics, using the normalized activity inputted from the normalized activity calculating unit, and then outputs the quantization scale code to a quantizing unit. The quantizing unit quantizes discrete cosine transform coefficients inputted from a band limiting unit on the basis of the quantization scale code inputted to the quantizing unit.

13 Claims, 12 Drawing Sheets

FIG. 5A

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 5B

| 0  | 4  | 6  | 20 | 22 | 36 | 38 | 52 |
|----|----|----|----|----|----|----|----|
| 1  | 5  | 7  | 21 | 23 | 37 | 39 | 53 |
| 2  | 8  | 19 | 24 | 34 | 40 | 50 | 54 |
| 3  | 9  | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

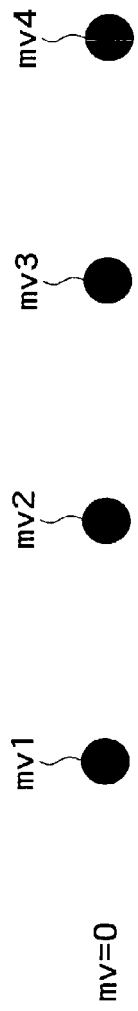
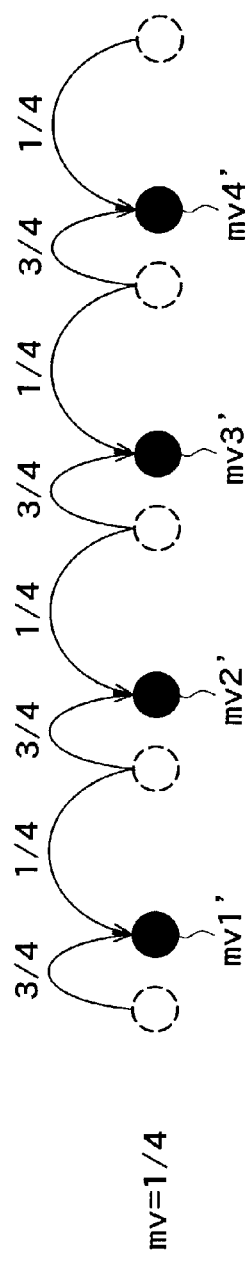
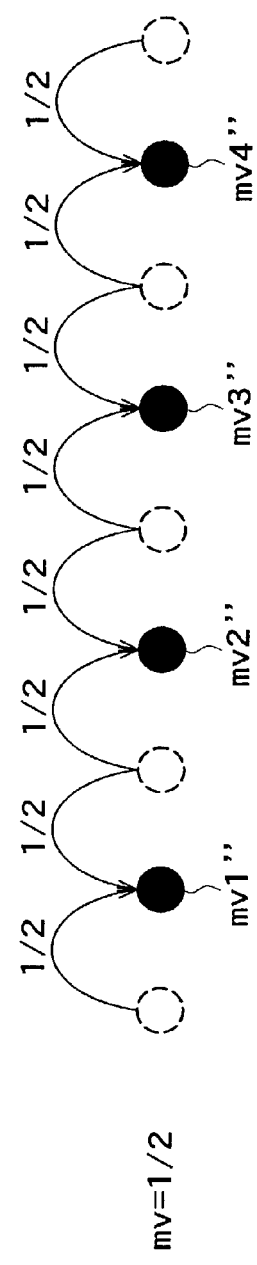
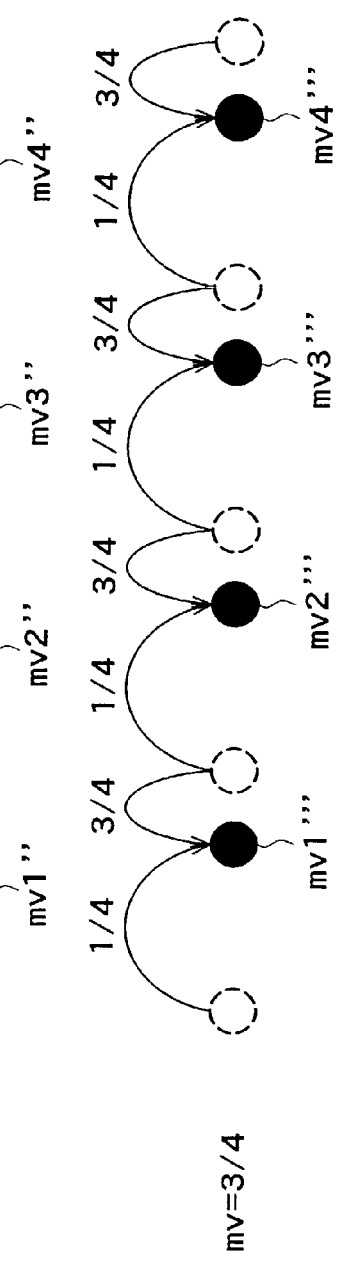
FIG. 9A  mv=0
FIG. 9B  mv=1/4
FIG. 9C  mv=1/2
FIG. 9D  mv=3/4

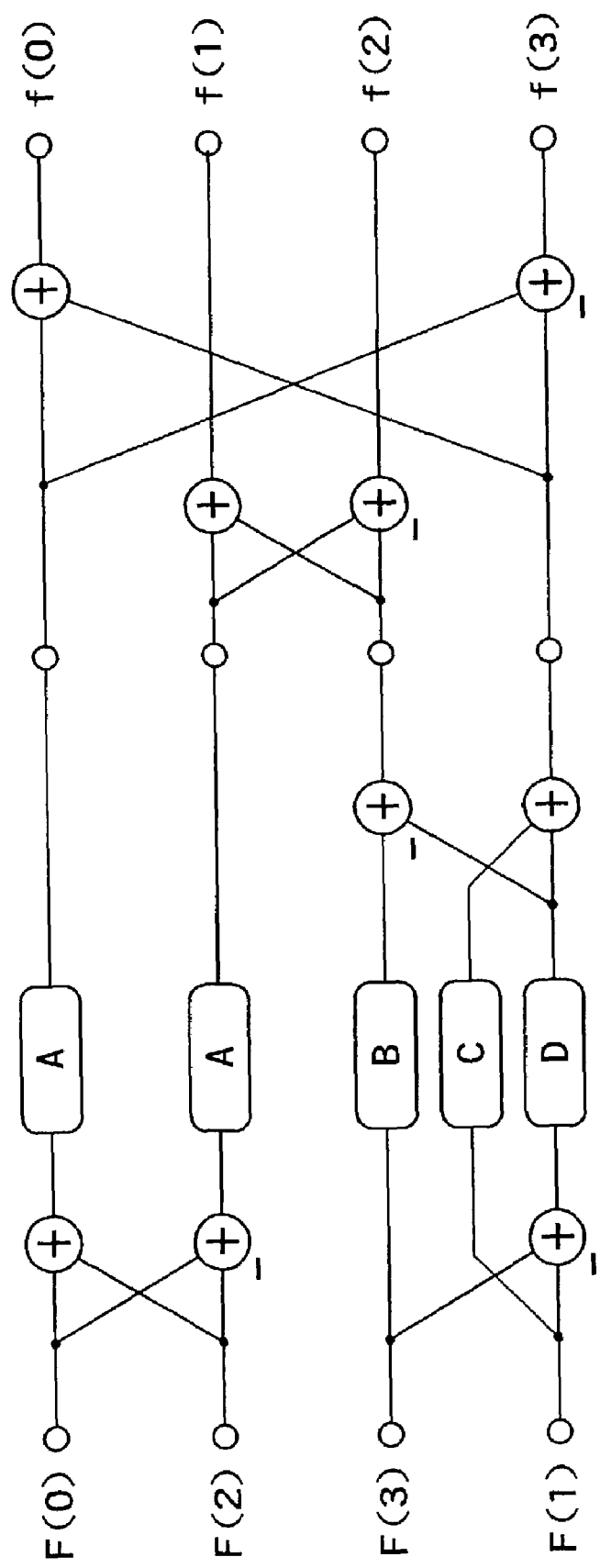

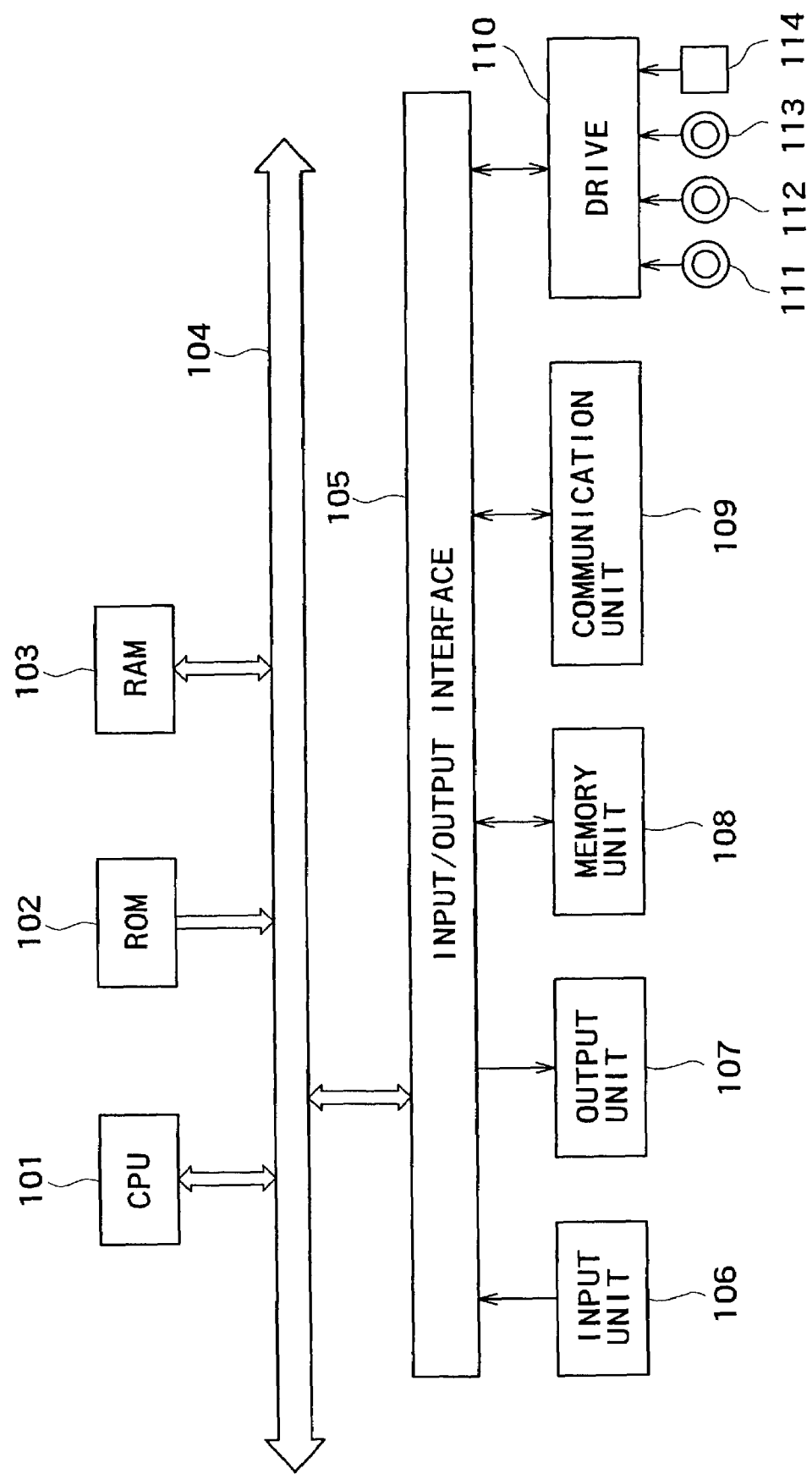

IMAGE PROCESSING APPARATUS AND METHOD, RECORDING MEDIUM, AND PROGRAM

BACKGROUND OF THE INVENTION

The present invention relates to an apparatus and a method for image processing, a recording medium, and a program and, particularly, to an apparatus and a method for image processing, a recording medium, and a program that make it possible to realize high-speed processing for converting image information (bit stream) compressed by an orthogonal transform, such as a discrete cosine transform in MPEG (Moving Picture Experts Group) or the like, and motion compensation into image data with a lower bit rate.

Recently, apparatuses based on MPEG and other schemes that handle image data as digital information and compress the image data by an orthogonal transform, such as a discrete cosine transform, and motion compensation using redundancy specific to the image data for the purposes of highly efficient transmission and storage of the information have been spreading for use by broadcasting stations or the like in distributing information or in ordinary households in receiving information.

MPEG2 (ISO/IEC 13818-2), in particular, is defined as a general-purpose image-coding scheme, and is a standard provided for interlaced-scanning images and progressive scanning images as well as standard-resolution images and high-resolution images. MPEG2 is therefore expected to continue to be used in the future in a wide variety of application software for business use by the broadcasting industry and for use by general users. With an MPEG2 compression method, by assigning a code amount (bit rate) of 4 to 8 Mbps to an interlaced-scanning image of standard resolution formed of 720 pixels×480 pixels and a code amount (bit rate) of 18 to 22 Mbps to an interlaced-scanning image of high resolution formed of 1920 pixels×1088 pixels, for example, it is possible to compress the images while maintaining a high compression ratio and good image quality and realize transmission and storage of the compressed images.

However, an image of high resolution has an enormous amount of information. Even with compression using a coding scheme such as MPEG, as described above, a code amount (bit rate) of about 18 to about 22 Mbps or more is required for a 30-Hz interlaced-scanning image of 1920 pixels×1080 pixels, for example, in order to obtain sufficient image quality. Hence, the code amount (bit rate) needs to be further reduced while minimizing degradation in image quality, so as to adjust to the bandwidth of a transmission line when image information compressed by the MPEG method is to be transmitted via a network, such as cable television or satellite broadcasting, for example, and so as to adjust to the capacity of a recording medium when image information compressed by the MPEG method is to be stored (recorded) on a recording medium, such as an optical disk, a magnetic disk, or a magneto-optical disk. Such reduction of the code amount (bit rate) also may be required when compressed image information (bit stream) of an image of standard resolution (for example a 30-Hz interlaced-scanning image of 720 pixels×480 pixels) as well as an image of high resolution is to be transmitted via a network or recorded on a recording medium as described above.

As means for solving such a problem, there are methods such as hierarchical coding (scalability) processing and image information converting (transcoding) processing. In relation to the former method, SNR (Signal to Noise Ratio) scalability is standardized in MPEG2 to thereby enable the hierarchical coding of high-SNR compressed image information (bit stream) and low-SNR compressed image information (bit stream). However, although the hierarchical coding requires that the restraining condition of the bandwidth of the network medium or the storage capacity of the recording medium be known at the time of the coding, such information is unknown in an actual system in most cases. Thus, the latter may be said to be a method having a higher degree of freedom and suited to an actual system.

The image information converting (transcoding) processing, for example, converts compressed image information compressed by the MPEG2 method into compressed image information with a lower bit rate. In the image information converting processing, information such as a picture coding type, a quantization width in each macroblock, and a quantization matrix is first extracted from the compressed image information compressed by the MPEG2 method. Then, the compressed image information is variable-length-decoded and rearranged into two-dimensional data as quantized discrete cosine transform coefficients. The quantized discrete cosine transform coefficients rearranged in the form of two-dimensional data are then inversely quantized on the basis of the quantization width and the quantization matrix mentioned above. Predetermined high-frequency component coefficients are cut from the inversely quantized discrete cosine transform coefficients. The resulting inversely quantized discrete cosine transform coefficients are requantized with a quantization width (quantization scale code) generated on the basis of a target bit rate (lower than the original bit rate), variable-length-coded again by the MPEG2 method, and then outputted.

The quantization width (quantization scale code) corresponding to the image information compressed by the MPEG2 method is determined by processing, to be explained with reference to the flowchart of FIG. 1, to thereby control the amount of codes. The following description will be made by taking as an example compressed image information compressed by an MPEG2 Test Model 5 (ISO/IEC JTC1/SC 9/WG11N400) method. In this code amount control, a target code amount (target bit rate) and a GOP (Group of Pictures) formation are input variables. The GOP in this case is a group of three picture types: an I (Intra Code) picture (picture coded separately by itself), a P (Predictive Code) picture (picture coded by a temporally previous (past) I-picture or P-picture), and a B (Bidirectionally Predictive Code) picture (picture coded by a temporally previous or subsequent (past or future) I-picture or P-picture) used in image compression by the MPEG2 method.

At a step S1, an amount of bits are allocated to each picture in the GOP on the basis of an amount of bits (hereinafter referred to as an assigned bit amount R) to be assigned to pictures not decoded yet in the GOP including the picture targeted for the allocation. The allocation is repeated in the order of coded pictures in the GOP. In this case, an amount of codes is assigned to each picture using two assumptions described below.

As a first assumption, it is assumed that a product of an average quantization scale code used in coding each picture and an amount of codes generated is constant for each picture type unless the screen is changed. Thus, variables $X_i$, $X_p$, and $X_b$ (global complexity measure) indicating the complexity of the screen are updated by the following equations (1) to (3). The relation between the amount of codes generated and the quantization scale code when the next picture is coded is estimated from the parameters.

$$X_i = S_i \cdot Q_i \quad (1)$$

$$X_p = S_p \cdot Q_p \quad (2)$$

$$X_b = S_b \cdot Q_b \quad (3)$$

where $S_i$, $S_p$, and $S_b$ denote the amount of code bits generated at the time of coding the picture; and $Q_i$, $Q_p$, and $Q_b$ denote an average quantization scale code at the time of coding the picture. Initial values are set as expressed by the following equations (4) to (6) using a target code amount (target bit rate) bit_rate (bits/sec).

$$X_i = 160 \times \text{bit\_rate}/115 \quad (4)$$

$$X_p = 60 \times \text{bit\_rate}/115 \quad (5)$$

$$X_b = 42 \times \text{bit\_rate}/115 \quad (6)$$

As a second assumption, it is assumed that overall picture quality is optimized at all times when the ratios $K_p$ and $K_b$ of the quantization scale codes of a P-picture and a B-picture with respect to the quantization scale code of an I-picture are values defined by equations (7) and (8).

$$K_p = Q_p/Q_i = 1.0 \quad (7)$$

$$K_b = Q_b/Q_i = 1.4 \quad (8)$$

Specifically, the quantization scale code of a B-picture is 1.4 times the quantization scale codes of an I-picture and a P-picture at all times. This assumes that when the B-picture is coded somewhat more roughly than the I-picture and the P-picture and an amount of codes thus saved in the B-picture are added to the I-picture and the P-picture, the picture quality of the I-picture and the P-picture is improved and, in turn, the picture quality of the B-picture using the I-picture and the P-picture as a reference is improved.

On the basis of the above two assumptions, bit amounts ($T_i$, $T_p$, and $T_b$) assigned to the pictures in the GOP are values expressed by equations (9) to (11).

$$T_i = \max\left\{ \frac{R}{1 + \frac{N_p \cdot X_p}{X_i \cdot K_p} + \frac{N_b \cdot X_b}{X_i \cdot K_b}}, \frac{\text{bit\_rate}}{8 \times \text{picture\_rate}} \right\} \quad (9)$$

$$T_P = \max\left\{ \frac{R}{N_p + \frac{N_b \cdot K_p \cdot X_b}{K_b \cdot X_p}}, \frac{\text{bit\_rate}}{8 \times \text{picture\_rate}} \right\} \quad (10)$$

$$T_b = \max\left\{ \frac{R}{N_b + \frac{N_p \cdot K_b \cdot X_p}{K_p \cdot X_b}}, \frac{\text{bit\_rate}}{8 \times \text{picture\_rate}} \right\} \quad (11)$$

where $N_p$ and $N_b$ denote the numbers of P-pictures and B-pictures not coded yet in the GOP. On the basis of the thus obtained assigned code amounts, the assigned bit amount R assigned to pictures not coded yet in the GOP is updated by the following equation (12) each time a picture is coded.

$$R = R - S_{i,p,b}; \quad (12)$$

When a first picture in the GOP is coded, the assigned bit amount R is updated by an equation (13).

$$R = \frac{\text{bit\_rate} \times N}{\text{picture\_rate}} + R \quad (13)$$

where N denotes the number of pictures in the GOP. An initial value of the assigned bit amount R at the start of the sequence is zero.

At a step S2, in order that the bit amounts ($T_i$, $T_p$, and $T_b$) assigned to the pictures obtained by the equations (9) to (11) in the processing of the step S1 coincide with the amounts of codes actually generated, the quantization scale code is obtained by feedback control in macroblock units on the basis of the capacity of three virtual buffers set independently for each picture. In the following description, a macroblock is of a two-dimensional 8×8 formation.

Prior to the coding of a $j$th macroblock, the occupancy quantity of the virtual buffers is obtained by equations (14) to (16), $$d_j^i = d_0^i + B_{j-1} - \frac{T_i \times (j-1)}{MB_{cnt}} \quad (14)$$

$$d_j^p = d_0^p + B_{j-1} - \frac{T_p \times (j-1)}{MB_{cnt}} \quad (15)$$

$$d_j^b = d_0^b + B_{j-1} - \frac{T_b \times (j-1)}{MB_{cnt}} \quad (16)$$

where $d_0^i$, $d_0^p$, and $d_0^b$ denote the initial occupancy quantity of the virtual buffers for the I-picture, P-picture, and B-picture, respectively; $B_j$ denotes an amount of bits generated from a head to a $j$th macroblock of a picture; and $MB_{cnt}$ denotes a number of macroblocks within one picture.

The virtual buffer occupancy quantity at the time of the end of the coding of each picture ($d_{MBcnt}^i$, $d_{MBcnt}^p$, $d_{MBcnt}^b$) is used as an initial value ($d_0^i$, $d_0^p$, and $d_0^b$) of the virtual buffer occupancy quantity for a next picture in the same picture type.

Next, the quantization scale code for the $j$th macroblock is calculated by the following equation (17):

$$Q_j = \frac{d_j \times 31}{r} \quad (17)$$

where r is a parameter for controlling response speed of a feedback loop, referred to as a reaction parameter. The parameter r is given by the following equation (18):

$$r = 2 \times \frac{\text{bit\_rate}}{\text{picture\_rate}} \quad (18)$$

Initial values of the virtual buffers at the start of a sequence are given by the following equations (19) to (21):

$$d_0^i = 10 \times \frac{r}{31} \quad (19)$$

$$d_0^p = K_p \cdot d_0^i \quad (20)$$

$$d_0^b = K_b \cdot d_0^i \quad (21)$$

At a step S3, the quantization scale code obtained by the processing of the step S2 is changed by a variable referred to as activity for each macroblock such that finer quantization is performed in a flat portion where degradation tends to be visually more noticeable and rougher quantization is performed in a portion of a complex pattern where degradation tends to be less noticeable.

The activity is given by the following equations (22) to (24) using pixel values of a luminescence signal of an original image, or pixel values of a total of eight blocks, that is, four blocks in a frame discrete cosine transform mode and four blocks in a field discrete cosine transform mode:

$$act_j = 1 + \min_{sblk = 1, 8} (var\_sblk) \quad (22)$$

[Equation 2]

$$var\_blk = \frac{1}{64} \sum_{k=1}^{64} (P_k - \overline{P})^2 \quad (23)$$

[Equation 3]

$$\overline{P} = \frac{1}{64} \sum_{k=1}^{64} P_k \quad (24)$$

where $P_k$ is a pixel value within a block of the luminescence signal of the original image. A minimum value is obtained in the equation (22) because quantization is made finer when there is a flat portion even in a part of the macroblock.

Then, a normalized activity $Nact_j$ having a value in a range of 0.5 to 2 is obtained by an equation (25).

$$Nact_j = \frac{2 \times act_j + avg\_act}{act + 2 \times avg\_act} \quad (25)$$

where Avg_act is an average value of $act_j$ in an immediately preceding coded picture. A quantization scale code $mquant_j$ where visual characteristics are taken into consideration is given by an equation (26) on the basis of the value of the quantization scale code $Q_j$ obtained at the step S2.

$$mquant_j = Q_j \times Nact_j \quad (26)$$

With the quantization scale code $mquant_j$ thus obtained, the compressed image information compressed by the MPEG2 method is converted into compressed image information with a lower target bit rate.

However, the method described above requires the calculation of an average pixel value for each macroblock in the equations (22) to (24) every time the image conversion processing is performed, thus requiring an enormous amount of processing for the calculation. As a result, the processing takes time, and the cost of the apparatus is increased because hardware capable of the enormous calculations is required.

In addition, while the activity described above is calculated using the pixel values of a luminescence signal of an original image, it is not possible to know the pixel values of the luminescence signal of the original image in the image conversion processing. Therefore, when the input compressed image information has been subjected to efficient adaptive quantization adapted to the complexity of the image by detection of skin color or detection of red, for example, adaptive quantization using similar normalized activity information cannot be performed at the time of requantization.

SUMMARY OF THE INVENTION

The present invention has been made in view of such a situation, and it is accordingly an object of the present invention to realize high-speed processing for converting image information (bit stream) compressed by an orthogonal transform, such as a discrete cosine transform in MPEG or the like, and motion compensation and then coded into image data with a lower bit rate when the image information is to be transmitted via a network, such as satellite broadcasting, cable television, or the Internet, and when the image information is to be recorded (stored) on a recording medium, such as an optical disk, a magnetic disk, or a magneto-optical disk.

According to the present invention, there is provided an image processing apparatus which includes: first quantization scale code calculating means for calculating a first quantization scale code required to code image data at a first bit rate on the basis of the image data coded at the first bit rate; second quantization scale code calculating means for calculating a second quantization scale code obtained by subjecting the first quantization scale code to adaptive quantization according to visual characteristics on the basis of the image data coded at the first bit rate; normalized activity calculating means for calculating a normalized activity on the basis of the first quantization scale code and the second quantization scale code; third quantization scale code calculating means for calculating a third quantization scale code required to code the image data at a second bit rate; and fourth quantization scale code calculating means for calculating a fourth quantization scale code obtained by subjecting the third quantization scale code to adaptive quantization according to visual characteristics on the basis of the third quantization scale code and the normalized activity.

The second bit rate can be lower than the first bit rate.

The coded image data can be image data compressed by an MPEG method.

The image data coded at the first bit rate can include an amount of codes of the image data itself, an amount of bits generated in each frame, an amount of bits generated in each macroblock, and a quantization step size in each macroblock.

The first quantization scale code calculating means can calculate the first quantization scale code on the basis of the amount of codes, the amount of bits generated in each frame, and the amount of bits generated in each macroblock.

The second quantization scale code calculating means can calculate the second quantization scale code obtained by subjecting the first quantization scale code to adaptive quantization according to visual characteristics by dividing the quantization step size in each macroblock by 2.

The normalized activity calculating means can calculate the normalized activity by dividing the second quantization scale code by the first quantization scale code.

According to the present invention, there is provided an image processing method which includes: a first quantization scale code calculating step for calculating a first quantization scale code required to code image data at a first bit rate on the basis of the image data coded at the first bit rate; a second quantization scale code calculating step for calculating a second quantization scale code obtained by subjecting the first quantization scale code to adaptive quantization according to visual characteristics on the basis of the image data coded at the first bit rate; a normalized activity calculating step for calculating a normalized activity on the basis of the first quantization scale code and the second quantization scale code; a third quantization scale code calculating step for calculating a third quantization scale code required to code the image data at a second bit rate; and a fourth quantization scale code calculating step for calculating a fourth quantization scale code obtained by subjecting the third quantization scale code to adaptive quantization according to visual characteristics on the basis of the third quantization scale code and the normalized activity.

According to the present invention, there is provided a program on a recording medium, the program including: a first quantization scale code calculation control step for controlling the calculation of a first quantization scale code required to code image data at a first bit rate on the basis of the image data coded at the first bit rate; a second quantization scale code calculation control step for controlling the calculation of a second quantization scale code obtained by subjecting the first quantization scale code to adaptive quantization according to visual characteristics on the basis of the image data coded at the first bit rate; a normalized activity calculation control step for controlling the calculation of a normalized activity on the basis of the first quantization scale code and the second quantization scale code; a third quantization scale code calculation control step for controlling the calculation of a third quantization scale code required to code the image data at a second bit rate; and a fourth quantization scale code calculation control step for controlling the calculation of a fourth quantization scale code obtained by subjecting the third quantization scale code to adaptive quantization according to visual characteristics on the basis of the third quantization scale code and the normalized activity.

According to the present invention, there is provided a program executed by a computer, the program including: a first quantization scale code calculation control step for controlling the calculation of a first quantization scale code required to code image data at a first bit rate on the basis of the image data coded at the first bit rate; a second quantization scale code calculation control step for controlling the calculation of a second quantization scale code obtained by subjecting the first quantization scale code to adaptive quantization according to visual characteristics on the basis of the image data coded at the first bit rate; a normalized activity calculation control step for controlling the calculation of a normalized activity on the basis of the first quantization scale code and the second quantization scale code; a third quantization scale code calculation control step for controlling the calculation of a third quantization scale code required to code the image data at a second bit rate; and a fourth quantization scale code calculation control step for controlling calculation of a fourth quantization scale code obtained by subjecting the third quantization scale code to adaptive quantization according to visual characteristics on the basis of the third quantization scale code and the normalized activity.

The image processing apparatus and method and the program according to the present invention calculate a first quantization scale code required to code image data at a first bit rate on the basis of the image data coded at the first bit rate, calculate a second quantization scale code obtained by subjecting the first quantization scale code to adaptive quantization according to visual characteristics on the basis of the image data coded at the first bit rate, calculate a normalized activity on the basis of the first quantization scale code and the second quantization scale code, calculate a third quantization scale code required to code the image data at a second bit rate, and calculate a fourth quantization scale code obtained by subjecting the third quantization scale code to adaptive quantization according to visual characteristics on the basis of the third quantization scale code and the normalized activity.

BRIEF DESCRIPTION OF THE DRAWINGS

FIGS. 5A and 5B are diagrams of assistance in explaining scan methods;

FIGS. 9A, 9B, 9C, and 9D are diagrams of assistance in explaining motion compensative prediction processing with a ¼-pixel precision;

FIG. 10 is a diagram of assistance in explaining inverse discrete cosine transform processing and discrete cosine transform processing based on Wang's fast algorithm;

FIG. 12 is a diagram of assistance in explaining a medium.

DETAILED DESCRIPTION OF THE PREFERRED EMBODIMENTS

Figure 1:
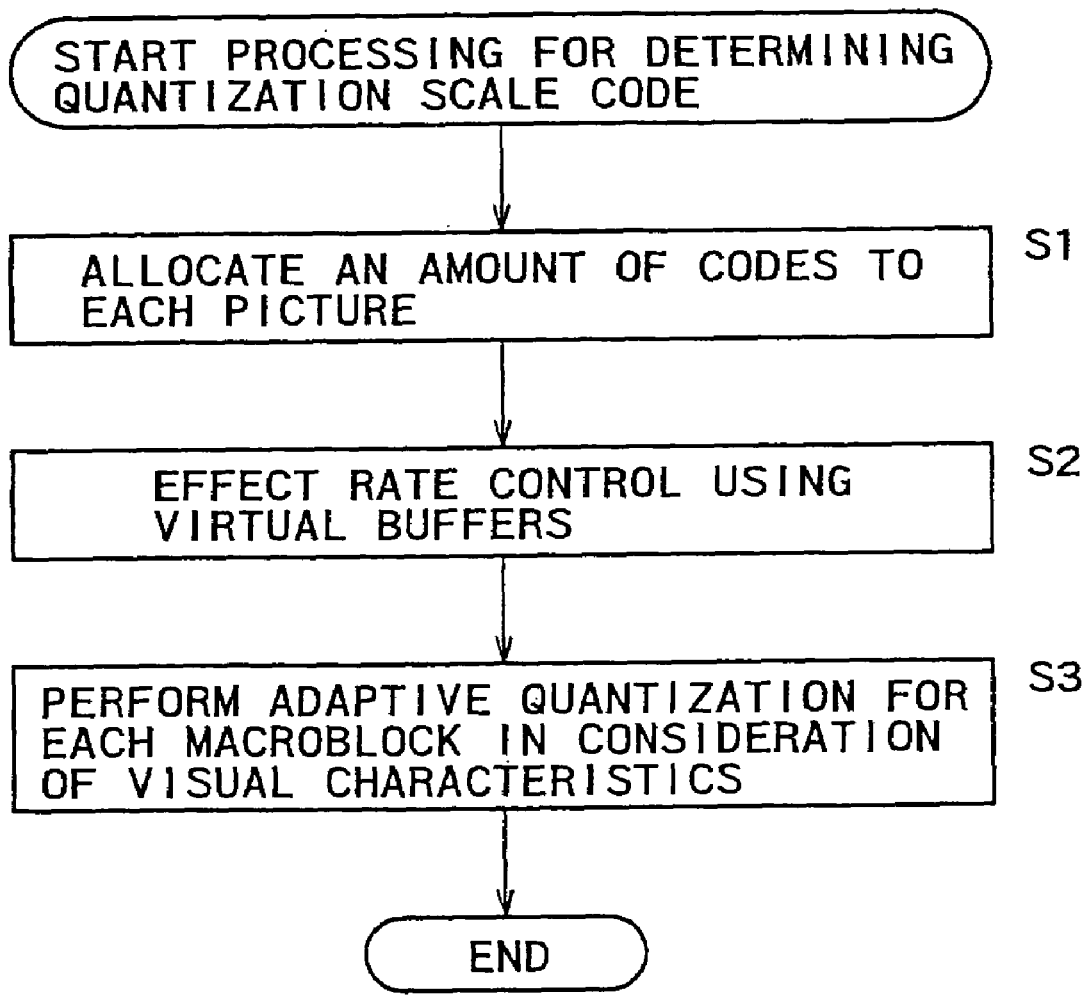
FIG. 1 is a flowchart of assistance in explaining conventional quantization scale code determination processing.
Figure 2:
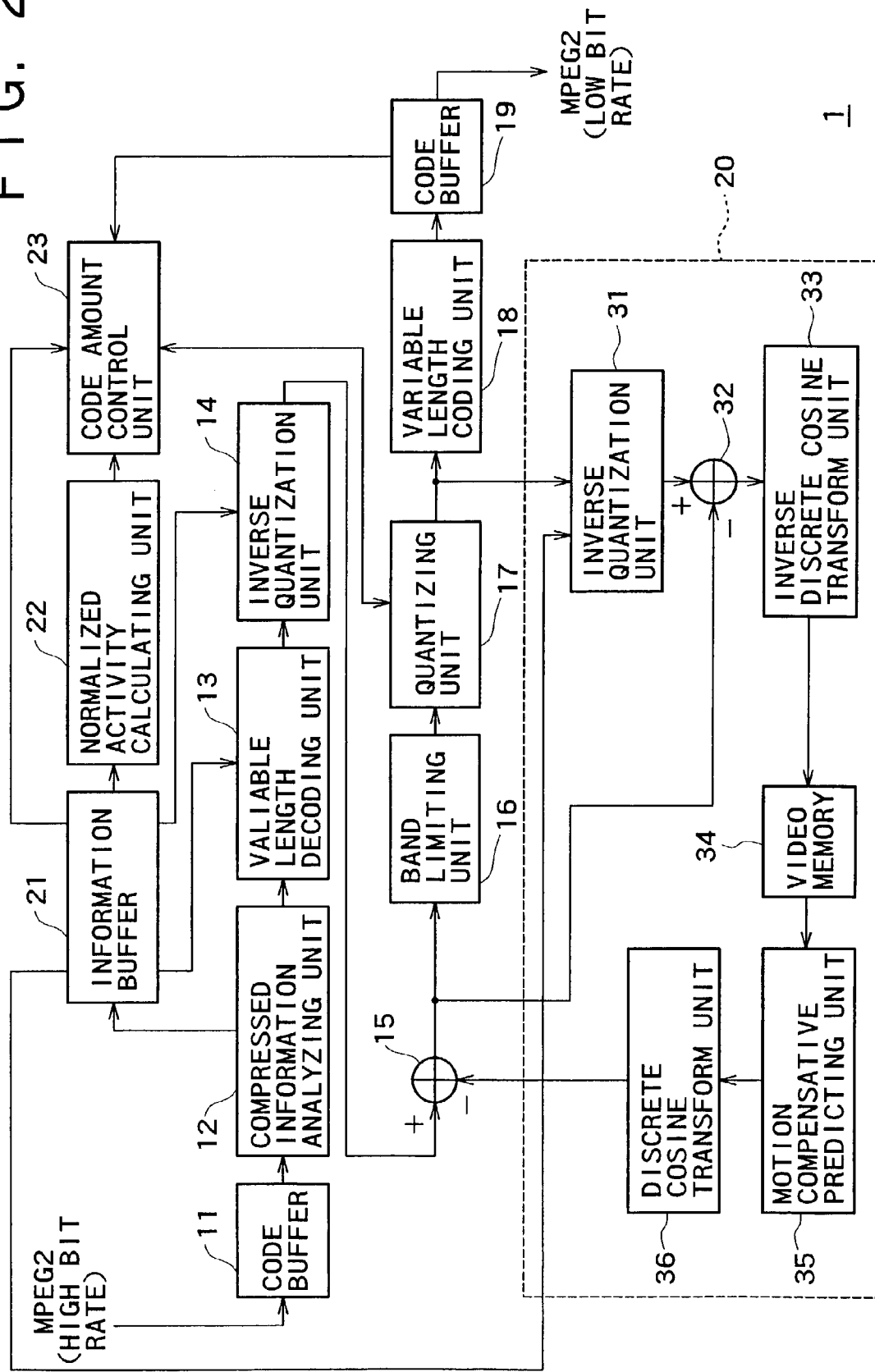
FIG. 2 is a block diagram showing a configuration of an embodiment of a transcoder to which the present invention is applied.

FIG. 2 is a diagram showing a configuration of an embodiment of a transcoder 1 according to the present invention. The transcoder 1 converts bit rate of input compressed image information compressed by a predetermined compression method and then outputs the result. Specifically, the transcoder 1, for example, performs the process of converting compressed image information with a bit rate of 20 Mbps already compressed by the MPEG2 method into compressed image information with a bit rate of 16 Mbps compressed by the same MPEG2 method. Of course, the bit rate of the input compressed image information and the bit rate of the compressed image information after the conversion may be other than the above bit rates.

A code buffer 11 receives input compressed image information with a high bit rate (compressed image information (bit stream) having a large amount of codes), temporarily stores the input compressed image information, and then sequentially outputs the input compressed image information to a compressed information analyzing unit 12. The compressed image information (bit stream) stored in the code buffer 11 is coded so as to satisfy a restraining condition of a not shown VBV (Video Buffering Verifier: device for monitoring the overflow or underflow of the bit stream) specified by MPEG2. Thus, the compressed image information is coded so as to prevent an overflow or underflow in the code buffer 11.

The compressed information analyzing unit 12 analyzes the compressed image information inputted from the code buffer 11 according to a syntax defined by MPEG2. The compressed information analyzing unit 12 thereby extracts from the compressed image information (bit stream) information such as an amount of codes, an amount of bits generated in each frame, an amount of bits generated in each macroblock, a quantization scale code, a quantization step size in each macroblock, a q_scale_type flag, a quantization matrix, and a scan method, and then stores the information in an information buffer 21. The compressed information analyzing unit 12 outputs information of the quantization width, the quantization matrix, and the scan method to a variable length decoding unit 13 in addition to the compressed image information. The amount of codes is a value indicating the so-called bit rate. The amount of bits generated in each frame or the amount of bits generated in each macroblock is an amount of bits used in the frame unit or the macroblock unit of the compressed image. The quantization scale code is a code for specifying a value serving as a reference in quantization processing. The quantization step size in each macroblock is a value indicating a quantization step interval specified by the quantization scale code. The q_scale_type flag indicates by 1 or 0 whether a relation between the quantization scale code and a quantizing value in quantization is linear (Linear Q) or non-linear (Non-Linear Q). The quantization matrix is used in the quantizing operation. The scan method is information indicating a scan method such, for example, as a zigzag scan or an alternate scan.

The variable length decoding unit 13 first subjects, to variable length decoding, data of the compressed image information inputted from the compressed information analyzing unit 12, which data is coded as a difference value with respect to an adjacent block for a direct-current component of an intra-macroblock, and data of the compressed image information inputted from the compressed information analyzing unit 12, which data is coded by run (number of consecutive zeros in the codes) and level (value other than zero in the codes) for other coefficients. The variable length decoding unit 13 thereby obtains quantized one-dimensional discrete cosine transform coefficients. The variable length decoding unit 13 next rearranges the quantized discrete cosine transform coefficients as two-dimensional data on the basis of the information on the scan method (zigzag scan or alternate scan) of the image which information is extracted by the compressed information analyzing unit 12, and outputs the result to an inverse quantization unit 14 together with the information of the quantization width and the quantization matrix. Incidentally, the scan method will be described later with reference to FIGS. 5A and 5B.

The inverse quantization unit 14 inversely quantizes the quantized discrete cosine transform coefficients in the form of the two-dimensional data inputted from the variable length decoding unit 13 on the basis of the information on the quantization width and the quantization matrix and then outputs the result as discrete cosine transform coefficients to an adder 15. The adder 15 subtracts error components of the discrete cosine transform coefficients inputted from a motion compensation error correcting unit 20 from the discrete cosine transform coefficients inputted from the inverse quantization unit 14. The adder 15 then outputs the motion-compensated discrete cosine transform coefficients to a band limiting unit 16 and also to an adder 32 in the motion compensation error correcting unit 20.

The band limiting unit 16 cuts high-frequency component coefficients in a horizontal direction in each 8×8 block on the basis of the motion-compensated, discrete cosine transform coefficients obtained as an output of the adder 15 and then outputs the result to a quantizing unit 17.

The quantizing unit 17 quantizes the 8×8 discrete cosine transform coefficients inputted from the band limiting unit 16 on the basis of a quantization scale code corresponding to a target bit rate, which quantization scale code is inputted from a code amount control unit 23. The quantizing unit 17 outputs the quantized discrete cosine transform coefficients to a variable length coding unit 18 and to an inverse quantization unit 31 in the motion compensation error correcting unit 20. The variable length coding unit 18 subjects the quantized discrete cosine transform coefficients inputted from the quantizing unit 17 to variable length coding by the MPEG2 method. The variable length coding unit 18 outputs the result to a code buffer 19, so that the result is temporarily stored in the code buffer 19. The code buffer 19 temporarily stores the compressed image information converted to a low bit rate. The code buffer 19 outputs the compressed image information; and it also outputs the compressed image information to the code amount control unit 23.

A normalized activity calculating unit 22 calculates a normalized activity that is calculated from the luminescence component pixel values of the original image on the basis of information such as the bit rate, the amount of bits generated in each frame, and the amount of bits generated and the quantization step size in each macroblock from the information buffer 21. The normalized activity calculating unit 22 then outputs the normalized activity to the code amount control unit 23.

The code amount control unit 23 calculates the quantization scale code corresponding to the target bit rate, which quantization scale code matches visual characteristics, using the normalized activity inputted from the normalized activity calculating unit 22, and then outputs the quantization scale code to the quantizing unit 17.

The inverse quantization unit 31 in the motion compensation error correcting unit 20 inversely quantizes the quantized discrete cosine transform coefficients inputted from the quantizing unit 17 on the basis of the information on the quantization width and the quantization matrix and then outputs the result to the adder 32. The adder 32 calculates the differences between the discrete cosine transform coefficients inputted from the inverse quantization unit 31 and the discrete cosine transform coefficients inputted from the adder 15 and then outputs the differences to an inverse discrete cosine transform unit 33. The inverse discrete cosine transform unit 33 subjects the difference values between the discrete cosine transform coefficients inputted from the inverse quantization unit 31 and the discrete cosine transform coefficients inputted from the adder 15 to inverse discrete cosine transform processing, and thereby generates motion compensation error correcting information (error data). The inverse discrete cosine transform unit 33 outputs the motion compensation error correcting information to a video memory 34, so that the motion compensation error correcting information is stored in the video memory 34.

A motion compensative predicting unit 35 performs motion compensation processing based on the error data in the video memory 34 on the basis of motion vector information and motion compensative prediction mode information (field motion compensative prediction mode or frame motion compensative prediction mode and forward prediction mode, backward prediction mode, or bi-directional prediction mode) in the input compressed image information (bit stream). The motion compensative predicting unit 35 thereby generates error correcting values in a spatial domain and then outputs the error correcting values to a discrete cosine transform unit 36. The discrete cosine transform unit 36 subjects the error correcting values in the spatial domain inputted from the motion compensative predicting unit 35 to discrete cosine transform processing. The discrete cosine transform unit 36 thereby obtains error correcting values in a frequency domain and then outputs the error correcting values in the frequency domain to the adder 15.

Figure 3:
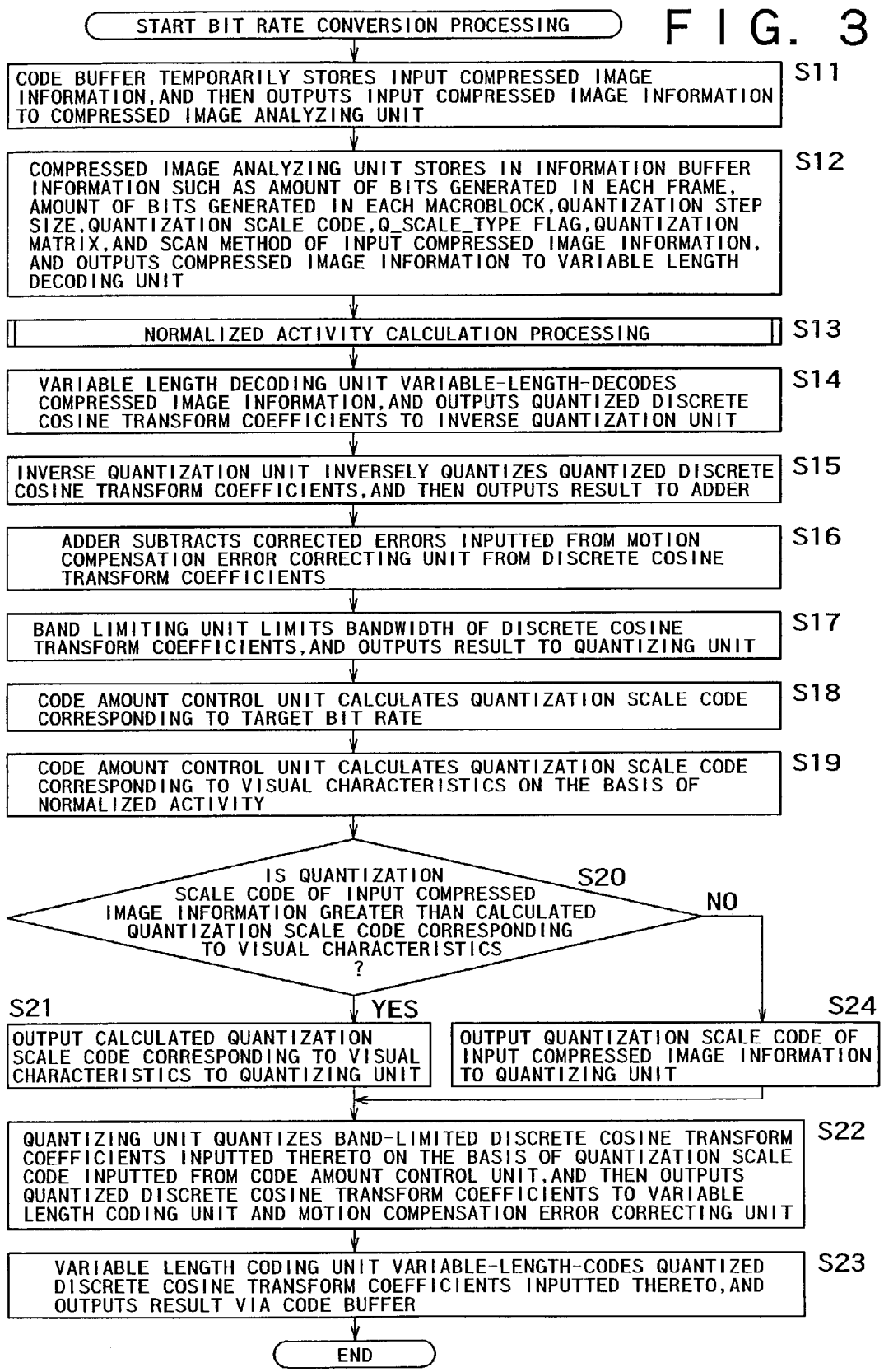
FIG. 3 is a flowchart of assistance in explaining bit rate conversion processing.

The bit rate conversion processing for converting compressed image information compressed by the MPEG2 method and with a bit rate of 20 Mbps into compressed image information compressed by the MPEG2 method and with a bit rate of 16 Mbps will be described next with reference to the flowchart of FIG. 3. At a step S11, the code buffer 11 temporarily stores the input compressed image information, and then it outputs the input compressed image information to the compressed information analyzing unit 12. At step S12, the compressed information analyzing unit 12 extracts information such as the amount of bits generated in each frame, the amount of bits generated in each macroblock, the quantization scale code, the quantization step size, the q_scale_type flag, the quantization matrix, and the scan method from the compressed image information (bit stream) inputted from the code buffer. The compressed information analyzing unit 12 then stores the information in the information buffer 21. The compressed information analyzing unit 12 outputs the compressed image information to the variable length decoding unit 13.

At a step S13, the normalized activity calculating unit 22 performs normalized activity calculation (reverse operation) processing for calculating a normalized activity that is calculated from luminescence component pixel values of the original image, by the following method using the input information for each macroblock stored in the information buffer 21.

Figure 4:
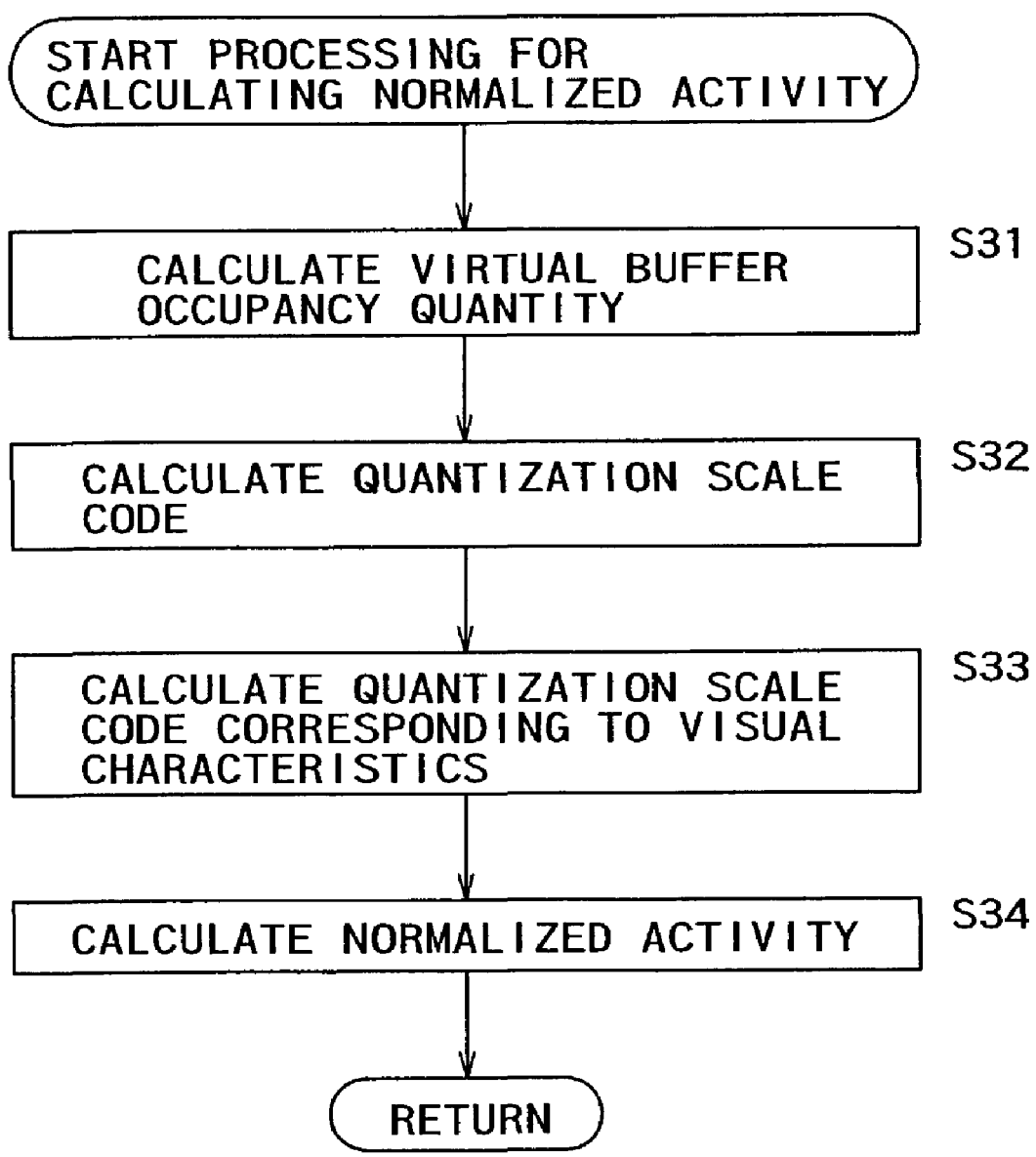
FIG. 4 is a flowchart of assistance in explaining normalized activity calculation processing.

The normalized activity calculation processing will next be described with reference to the flowchart of FIG. 4. The normalized activity calculating unit 22 calculates the normalized activity using the following method, regardless of whether the q_scale_type flag indicating a quantization type, which flag is extracted from the input compressed image information (bit stream) compressed by the MPEG2 method, indicates Linear Q or Non-Linear Q.

At a step S31, prior to the coding of a $j$th macroblock, the normalized activity calculating unit 22 calculates the occupancy quantity of virtual buffers at the time of coding the input bit stream by equations (27) to (29).

$$d_{in,j}^i = d_{in,0}^i + B_{in,j-1} - \frac{T_{in,i} \times (j-1)}{MB_{cnt}} \quad (27)$$

$$d_{in,j}^p = d_{in,0}^p + B_{in,j-1} - \frac{T_{in,p} \times (j-1)}{MB_{cnt}} \quad (28)$$

$$d_{in,j}^b = d_{in,0}^b + B_{in,j-1} - \frac{T_{in,b} \times (j-1)}{MB_{cnt}} \quad (29)$$

$d_{in,o}^i$, $d_{in,o}^p$, and $d_{in,o}^b$ denote the initial occupancy quantity of the virtual buffers supposed for the time of coding the input compressed image information (bit stream); $B_{in,j}$ denotes an amount of bits generated from a head to a $j$th macroblock of a picture of the input compressed image information (bit stream); $MB_{cnt}$ denotes a number of macroblocks within one picture; and $T_{in,i}$, $T_{in,p}$, and $T_{in,b}$ denote an amount of bits generated in an input frame. The virtual buffer occupancy quantity at the time of end of the coding of each picture ($d_{in,MBcnt}^i$, $d_{in,MBcnt}^p$, $d_{in,MBcnt}^b$) is used as an initial value ($d_{in,o}^i$, $d_{in,o}^p$, and $d_{in,o}^b$) of the virtual buffer occupancy quantity for a next picture in the same picture type.

At a step S32, the normalized activity calculating unit 22 calculates a quantization scale code $Q_{in}^j$ for the $j$th macroblock by the following equation (30):

$$Q_{in,j} = \frac{d_{in,j} \times 31}{r_{in}} \quad (30)$$

where $r_{in}$ is a parameter for controlling the response speed of a feedback loop, referred to as a reaction parameter. The parameter $r_{in}$ is given by the following equation (31) using the amount of codes (bit rate) of the input bit stream:

$$r_{in} = 2 \times \frac{\text{input\_bit\_rate}}{\text{picture\_rate}} \quad (31)$$

Initial values of the virtual buffers at the start of a sequence are given by the following equations (32) to (34):

$$d_{in,0}^i = 10 \times \frac{r_{in}}{31} \quad (32)$$

$$d_{in,0}^p = K_p \cdot d_{in,0}^i \quad (33)$$

$$d_{in,0}^b = K_b \cdot d_{in,0}^i \quad (34)$$

where $K_p$ and $K_b$ are calculated for the input compressed image information (bit stream) as in the method used for controlling the amount of codes of output compressed image information (bit stream).

At a step S33, the normalized activity calculating unit 22 determines a quantization scale code mquant$_{in,j}$ with visual characteristics taken into consideration (quantization scale code mquant$_{in,j}$ matching the visual characteristics) by an equation (35) using the quantization step size Q_step_size$_{in,j}$ of the input compressed image information (bit stream).

$$\text{mquant}_{in,j} = Q\_step\_size_{in,j}/2 \quad (35)$$

At a step S34, the normalized activity calculating unit 22 calculates a normalized activity Nact$_j$ used within the frame in code amount control at the time of coding the input compressed image information (bit stream), by an equation (36) using the quantization scale code mquant$_{in,j}$ determined by the equation (35) in consideration of the visual characteristics and the quantization scale code $Q_{in,j}$ for the $j$th macroblock calculated from the virtual buffer occupancy quantity at the time of coding the input bit stream.

$$Nact_j = \frac{mquant_{in,j}}{Q_{in,j}} \tag{36}$$

Such processing eliminates the conventional need for restoring the compressed image information of the original image to information of each pixel and determining the average value and the variance of the luminescence pixel values to calculate a normalized activity for each macroblock in requantization based on discrete cosine transform coefficients.

Returning to the flowchart of FIG. 3, a description will be made in the following.

After the normalized activity is calculated by the normalized activity calculation processing at step S13, the variable length decoding unit 13 rearranges the quantized discrete cosine transform coefficients of the input compressed image information as two-dimensional data on the basis of the scan method in the order of a zigzag scan, as shown in FIG. 5A or an alternate scan as shown in FIG. 5B, at a step S14. The variable length decoding unit 13 then outputs the result to the inverse quantization unit 14 together with the information of the quantization width and the quantization matrix.

FIG. 5A and FIG. 5B show the scan order of 8×8 discrete cosine transform coefficients by numbers. Specifically, as shown in FIG. 5A, the zigzag scan is performed sequentially from "0" at the upper left of the figure to "1" to the right thereof, and then to "2" to the lower left thereof, "3" thereunder, "4" to the upper right thereof, "5" to the upper right thereof, "6" to the right thereof, "7" to the lower left thereof, "8" to the lower left thereof, . . . in that order until "63" at the far-right column and the lowest row is reached. As shown in FIG. 5B, the alternate scan is performed sequentially from "0" at the upper left of the figure to "1" thereunder, and then to "2" thereunder, "3" thereunder, "4" one column to the right and three rows above, "5" thereunder, "6" to the upper right thereof, "7" thereunder, "8" to the lower left thereof, "9" thereunder, "10" to the lower left thereof, . . . in that order until "63" at the far-right column and the lowest row is reached.

At a step S15, the inverse quantization unit 14 inversely quantizes the quantized discrete cosine transform coefficients inputted thereto on the basis of the quantization scale code and the quantization matrix extracted by the compressed information analyzing unit 12 and then outputs the result as discrete cosine transform coefficients to the adder 15.

At a step S16, the adder 15 subtracts motion compensation errors resulting from motion compensation error correcting processing by the motion compensation error correcting unit 20, which will be described later, from the discrete cosine transform coefficients inputted from the inverse quantization unit 14. The adder 15 then outputs the error-corrected discrete cosine transform coefficients to the band limiting unit 16 and also to the adder 32.

Figure 6B:
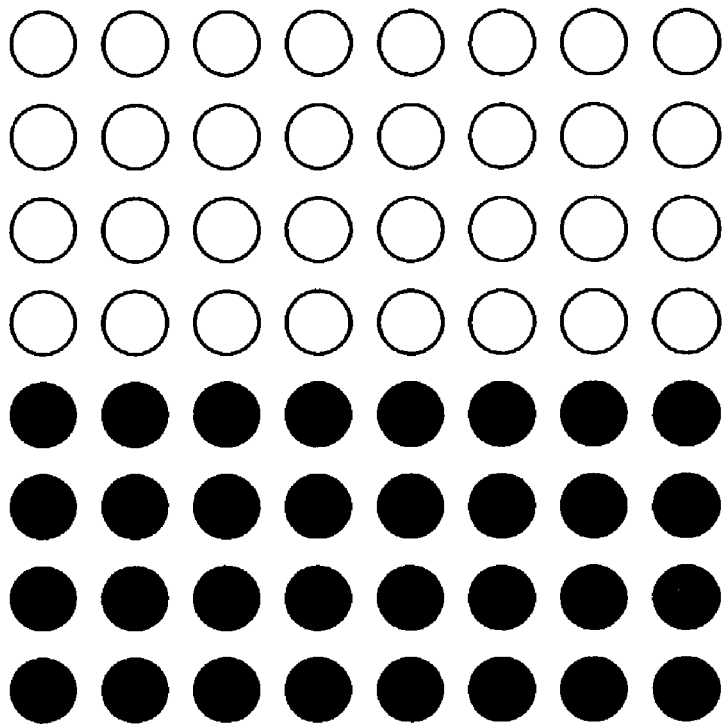
FIGS. 6A and 6B are diagrams of assistance in explaining the processing for cutting high-frequency components.
Figure 6A:
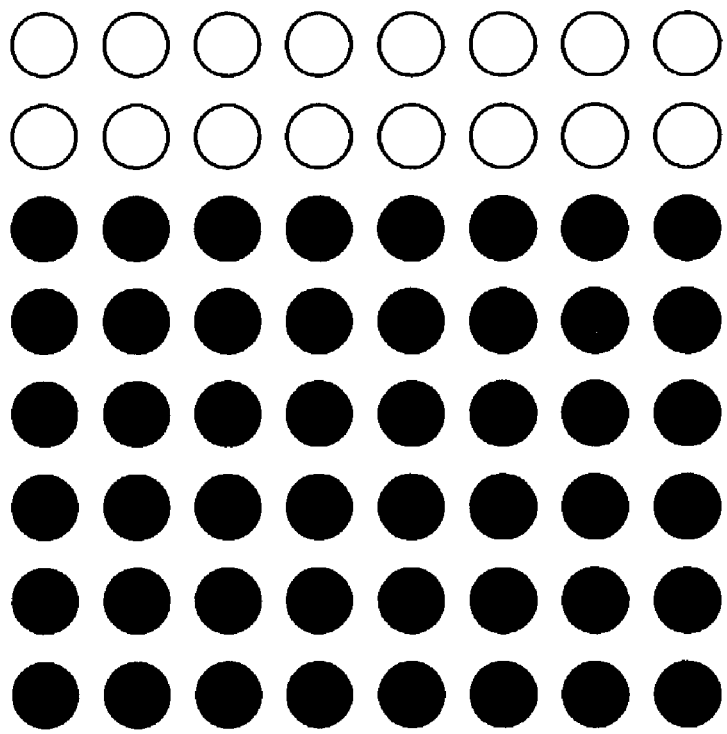

At a step S17, the band limiting unit 16 cuts high-frequency component coefficients in a horizontal direction in each block of the error-corrected discrete cosine transform coefficients inputted from the adder 15. In this case, the band limiting unit 16 cuts the high-frequency component coefficients in the horizontal direction of a luminescence signal and a color-difference signal separately. Specifically, as to a luminescence signal, as shown in FIG. 6A, the values of 8×6 discrete cosine transform coefficients (black circles in the figure) or the horizontal-direction low-frequency components of the 8×8 discrete cosine transform coefficients are preserved, and the remaining values are replaced with zero (0). As to a color-difference signal, as shown in FIG. 6B, the values of 8×4 discrete cosine transform coefficients (black circles in the figure), or the horizontal-direction low-frequency components of the 8×8 discrete cosine transform coefficients are preserved, and the remaining values are replaced with zero (0). In a case of the input compressed image information (bit stream) of an interlaced scanning image, a band limitation in a vertical direction is not placed because the band limitation, by including information on the difference in time between fields in high-frequency components in the vertical direction of the discrete cosine transform coefficients in a frame discrete cosine transform mode, leads to a significant degradation in image quality. As shown in this example, by placing a greater band limitation on a color-difference signal whose degradation is less visible to the human eye than on a luminescence signal whose degradation is more visible to the human eye, requantization distortion is reduced while minimizing degradation in image quality.

It is to be noted that the processing of the band limiting unit 16 may be performed by methods other than those illustrated in FIGS. 6A and 6B; for example, instead of the replacement with zero (0), the horizontal-direction high-frequency components of the discrete cosine transform coefficients may be multiplied by a weighting factor provided in advance so as to produce a similar effect.

At a step S18, the code amount control unit 23 calculates a quantization scale code $Q_{out,j}$ corresponding to compressed image information with the target bit rate (16 Mbps in this case). This processing is performed by the equation (17) in the conventional method and, therefore a description of the processing will be omitted.

At a step S19, the code amount control unit 23 determines a quantization scale code $mquant_{out,j}$ corresponding to the target bit rate in consideration of visual characteristics, using the following equation (37) on the basis of the quantization scale code $Q_{out,j}$ calculated by the processing of step S18 and the normalized activity $Nact_j$:

$$mquant_{out,j} = Q_{out,j} \times Nact_j \tag{37}$$

At a step S20, the code amount control unit 23 determines whether the quantization scale code $mquant_{in,j}$ of the input compressed image information is smaller than the quantization scale code $mquant_{out,j}$ calculated by the processing of step S19. When the code amount control unit 23 determines that the quantization scale code $mquant_{in,j}$ of the input, original compressed image information is greater than the quantization scale code $mquant_{out,j}$, the processing proceeds to a step S21.

At step S21, the code amount control unit 23 outputs the calculated quantization scale code $mquant_{out,j}$ to the quantizing unit 17.

At step S22, the quantizing unit 17 quantizes the band-limited compressed image information inputted from the band limiting unit 16 on the basis of the quantization scale code $mquant_{out,j}$ or the quantization scale code $mquant_{in,j}$ inputted from the code amount control unit 23 and then outputs the result to the variable length coding unit 18.

At step S23, the variable length coding unit 18 variable-length-codes a difference between a direct-current component of the quantized discrete cosine transform coefficients inputted thereto and a direct-current component coefficient of an immediately preceding block, using the direct-current component coefficient of the immediately preceding block as a predicted value. The variable length coding unit 18 rearranges other components into data in an one-dimensional arrangement on the basis of the preset scan method (zigzag scan or alternate scan) and performs variable length coding using a combination of numbers of consecutive zero coefficients (runs) and non-zero coefficients (levels), whereby the compressed image information inputted via the code buffer 11 is converted into compressed image information with the lower bit rate.

Figure 7B:
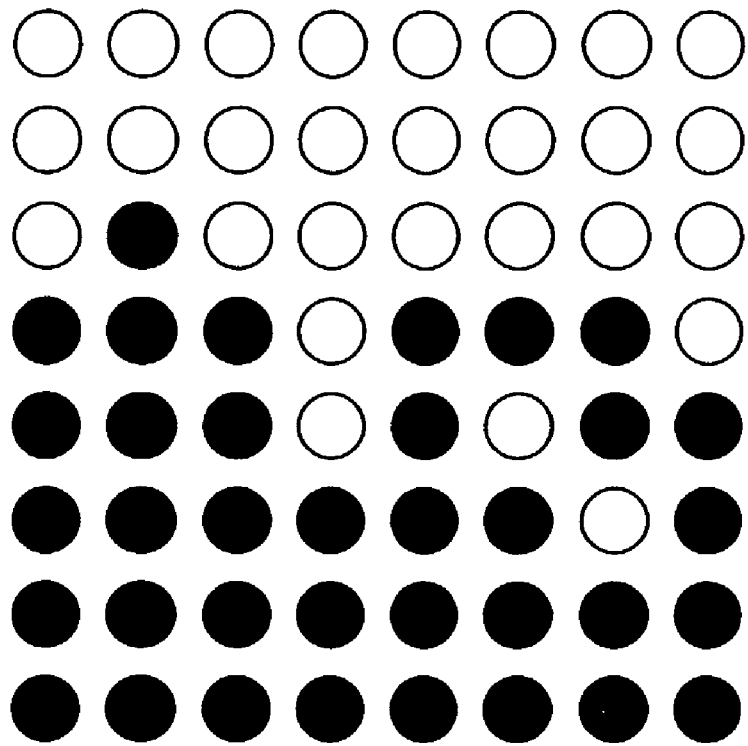
FIGS. 7A and 7B are diagrams of assistance in explaining the processing for cutting high-frequency components.
Figure 7A:
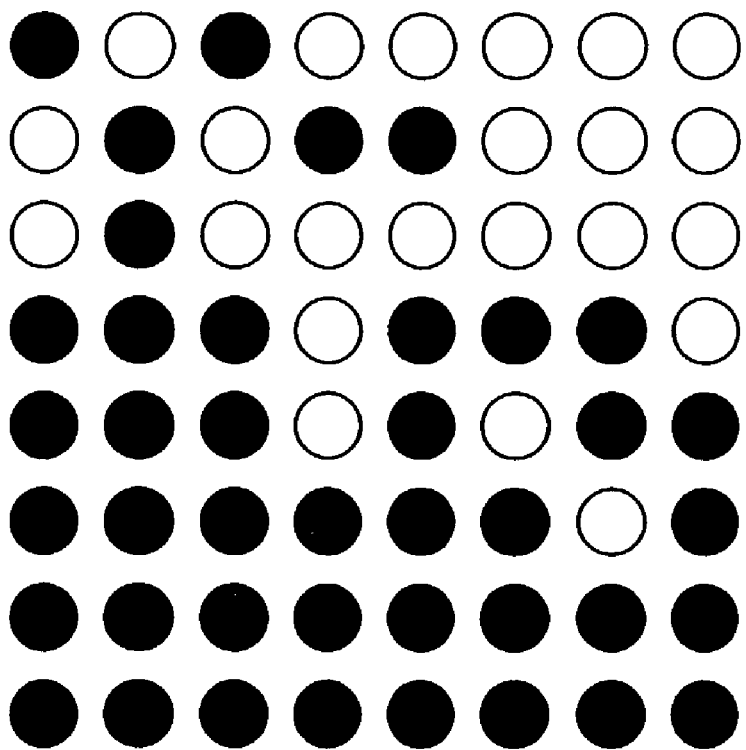

In this case, when coefficients subsequent in the scan order within the block are zero, the variable length coding unit 18 outputs a code referred to as EOB (End of Block) to thereby end the variable length coding of the block. When the coefficients of a block in the input compressed image information (bit stream) are as shown in FIG. 7A (in FIGS. 7A and 7B, black circles indicate non-zero coefficients and white circles indicate zero coefficients), for example, and discrete cosine transform coefficients are cut as shown in FIG. 6A, the non-zero coefficients are distributed as shown in FIG. 7B. When the discrete cosine transform coefficients are subjected to variable length coding by the zigzag scan, as shown in FIG. 5A, a last non-zero coefficient is situated at a scan number of "50" (coefficient at a fifth column from the left and a seventh row from the top in FIG. 5A). On the other hand, when the scan method is changed and the discrete cosine transform coefficients are subjected to variable length coding by the alternate scan, as shown in FIG. 5B, the last non-zero coefficient is situated at a scan number of "44" (coefficient at the fifth column from the left and the seventh row from the top in FIG. 5B). Thus, the EOB signal is set at the number detected by the alternate scan rather than the zigzag scan. Therefore, a correspondingly smaller value can be assigned to the quantization width to reduce quantization distortion resulting from requantization.

When the code amount control unit 23 determines at step S20 that the quantization scale code mquant$_{in,j}$ of the original compressed image information is not greater than the quantization scale code mquant$_{out,j}$, the code amount control unit 23 outputs the quantization scale code mquant$_{in,j}$ to the quantizing unit 17 at a step S24.

Specifically, when the code amount control unit 23 determines by the processing of step S20 that the quantization scale code mquant$_{in,j}$<the quantization scale code mquant$_{out,j}$, it means that a macroblock once quantized roughly is requantized more finely. Distortion resulting from rough quantization is not reduced by finer requantization. In addition, a large amount of bits are used for the macroblock. This results in a reduction of the bits assigned to other macroblocks, causing further degradation in image quality. Thus, when the code amount control unit 23 determines that the quantization scale code mquant$_{in,j}$<the quantization scale code mquant$_{out,j}$, the code amount control unit 23 uses the quantization scale code mquant$_{in,j}$ rather than the quantization scale code mquant$_{out,j}$ as the quantization scale code to be used in quantization.

Figure 8:
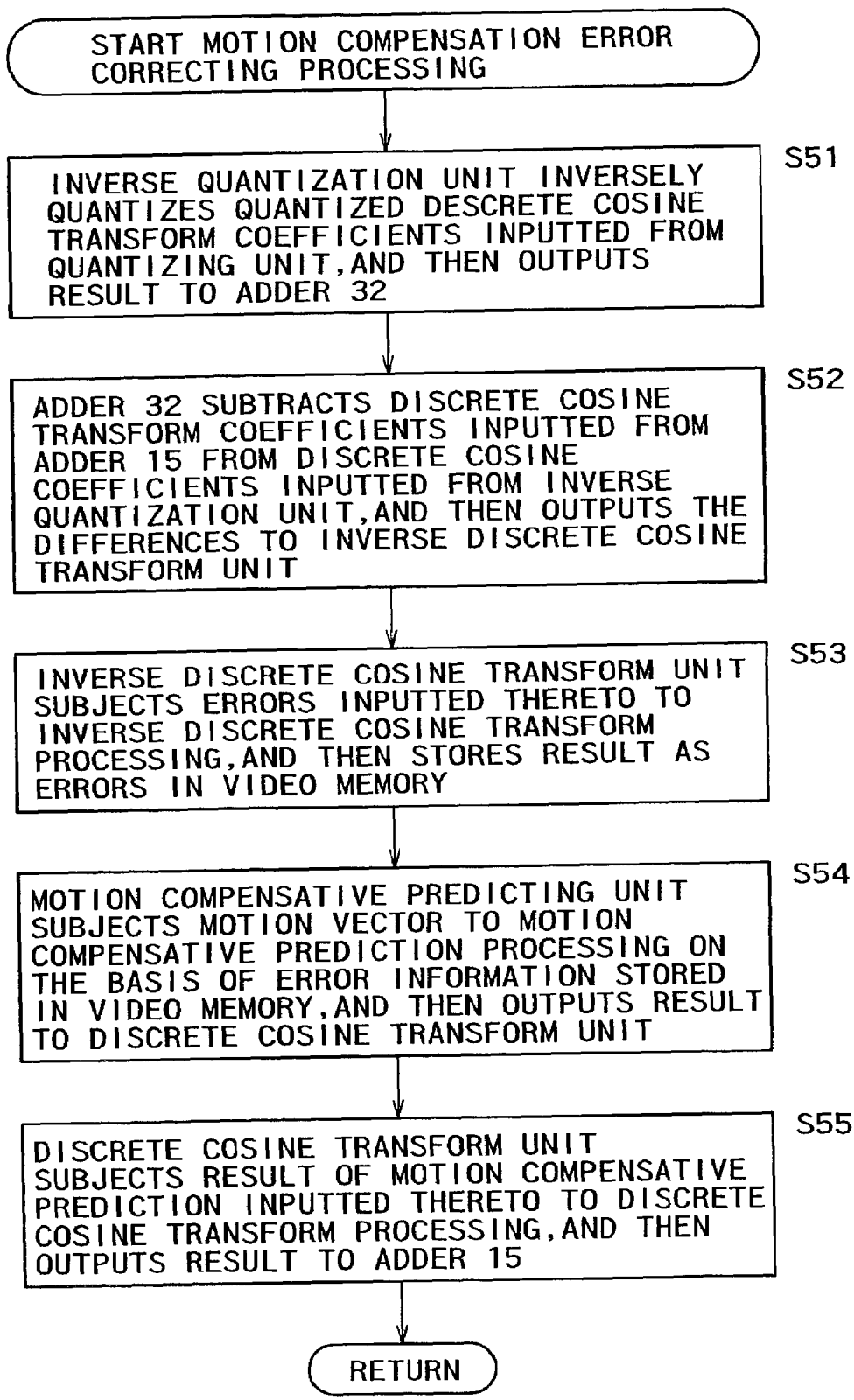
FIG. 8 is a flowchart of assistance in explaining motion compensation error correcting processing.

The motion compensation error correcting processing of the motion compensation error correcting unit 20 will be described next with reference to a flowchart of FIG. 8.

First, a cause of the occurrence of a motion compensation error will be described. Supposing that a pixel value of an original image is zero, consideration will be given to a reference pixel value L(Q1) decoded with a quantization width Q1 of input compressed image information (bit stream), which value corresponds to the pixel value of zero, and a pixel value L(Q2) of a reference image when decoded with a quantization width Q2 of compressed image information (bit stream) after recoding, which value corresponds to the pixel value of zero.

In the case of a pixel of an inter-macroblock of a P-picture or a B-picture, the difference value 0–L(Q1) is subjected to discrete cosine transform and then coded. However, the output compressed image information (bit stream) with a reduced amount of codes (bit rate) is decoded on the assumption that 0–L(Q2) has been subjected to discrete cosine transform and coded. In this case, supposing that the motion compensation error correcting processing of the motion compensation error correcting unit 20 is not performed, the quantization width Q1 is not equal to the quantization width Q2 in general, and, therefore, the difference value 0–L(Q1) and the difference value 0–L(Q2) are different from each other. Such a phenomenon occurs in a P-picture and a B-picture, thus causing a motion compensation error.

Moreover, degradation in picture quality occurring in a P-picture is propagated to a subsequent P-picture and a B-picture using the P-picture as a reference, thereby causing further degradation in picture quality. According to such a principle, there occurs a phenomenon (drift) in which as decoding of pictures of a GOP proceeds toward a later stage, an accumulation of motion compensation errors degrades picture quality, and good picture quality is regained at the start of the next GOP. Thus, the motion compensation error correcting processing makes compensation so as to prevent the values of the quantization width Q1 and the quantization width Q2 from becoming different from each other.

At a step S51, the inverse quantization unit 31 inversely quantizes discrete cosine transform coefficients inputted from the quantizing unit 17 on the basis of information on quantization width and a quantization matrix stored in the information buffer 21 and then outputs the result to the adder 32. At a step S52, the adder 32 subtracts discrete cosine transform coefficients inputted from the adder 15 from the discrete cosine transform coefficients inputted from the inverse quantization unit 31 and then outputs the difference values to the inverse discrete cosine transform unit 33. At a step S53, the inverse discrete cosine transform unit 33 subjects the difference values inputted thereto to inverse discrete cosine transform processing and then stores the result as motion compensation error correcting information in the video memory 34.

At a step S54, the motion compensative predicting unit 35 performs motion compensative prediction processing on the basis of the error data in the video memory 34, motion vector information and motion compensative prediction mode information (field motion compensative prediction mode or frame motion compensative prediction mode and forward prediction mode, backward prediction mode, or bi-directional prediction mode) in input compressed image information (bit stream). The motion compensative predicting unit 35 then outputs error correcting values in a spatial domain thereby generated to the discrete cosine transform unit 36. At a step S55, the discrete cosine transform unit 36 subjects the error correcting values inputted from the motion compensative predicting unit 35 to discrete cosine transform processing. The discrete cosine transform unit 36 then outputs the result as error correcting values in a frequency domain to the adder 15.

A fast algorithm, as illustrated in "A fast computational algorithm for the discrete cosine transform" (IEEE Trans. Commun., vol. 25, no.9, pp. 1004–1009, 1977), for example, may be applied to the processing of the inverse discrete cosine transform unit 33 and the discrete cosine transform unit 36. Regarding the processing of the inverse discrete cosine transform unit 33 and the discrete cosine transform unit 36, since high-frequency component coefficients of discrete cosine transform coefficients in the horizontal direction are replaced with zero by the band limiting unit 16, the inverse discrete cosine transform processing and the discrete cosine transform processing for the high-frequency component coefficients can be omitted to thereby reduce the amount of computational processing. It is therefore possible to simplify the configuration of the hardware for the computational processing.

In addition, since the color-difference signal of an image has a characteristic that degradation in the color-difference signal is less visible to the human eye than degradation in a luminescence signal of the image, by applying the above motion compensation error correcting processing to only the luminescence signal, the amount of computational processing can be reduced while maintaining the degradation in image quality at a minimum level. It is therefore possible to simplify the configuration of the hardware for the computational processing.

Moreover, while an error in a P-picture is propagated to a B-picture, an error in a B-picture is not further propagated. A B-picture has a bi-directional prediction mode, thus requiring an enormous amount of computational processing. Thus, by applying the motion compensation error correcting processing only to P-pictures, the amount of computational processing can be reduced while maintaining the degradation in image quality at a minimum level. It is therefore possible to simplify the configuration of the hardware for the computational processing. In addition, by omitting processing for B-pictures, it is possible to save the capacity of the video memory 34.

Furthermore, in the example described above, all of the 8×8 discrete cosine transform coefficient components are used as error correcting value components. In a particular case where the discrete cosine transform mode is a frame DCT mode and the scan method of input compressed image information (bit stream) is the interlaced scanning method, the motion compensation error correcting processing of the motion compensation error correcting unit 20 omits errors of high-frequency components in the vertical direction, thereby causing degradation in image quality. However, it is known that the omission of four high-frequency components in the horizontal direction does not cause visually affecting degradation in image quality. By taking advantage of this fact, the amount of computational processing can be reduced while maintaining the degradation in image quality at a minimum level. It is therefore possible to simplify the configuration of the hardware for the computational processing. In addition, it is possible to save the capacity of the video memory 34.

Thus, the inverse discrete cosine transform unit 33 and the discrete cosine transform unit 36 may perform usual eighth-order processing in the vertical direction and perform processing in the horizontal direction using only fourth-order coefficients, which are low-frequency components. This reduces the horizontal-direction resolution of the video memory 34 to ½ to thereby save the capacity of the video memory 34.

In this case, however, the motion compensative predicting unit 35 requires motion compensation processing with a ¼-pixel precision. As shown in FIGS. 9A, 9B, 9C, and 9D, this processing can sufficiently suppress degradation in image quality resulting from motion compensation errors by performing linear interpolation according to the value of a motion vector in compressed image information (bit stream). Processing for the horizontal direction includes the following means.

When there are pixels of original motion vectors $mv_1$ to $mv_4$, as shown in FIG. 9A, and the pixels are situated at a position displaced to the right in the horizontal direction by ¼ of the distance between the pixels as shown in FIG. 9B, a motion vector $mv_{1'}$ is calculated, as shown in the following equation (38):

$$mv_{1'} = \frac{3}{4} \times mv_1 + \frac{1}{4} \times mv_2 \qquad (38)$$

Thus, by a weighted average corresponding to the different positions, the motion vector at the position displaced by a ¼ pixel is calculated. Similarly, in the case of a position displaced to the right by the distance of a 2/4 (=½) pixel as shown in FIG. 9C, a motion vector $mv_{1''}$ is calculated as shown in the following equation (39):

$$mv_{1''} = \frac{1}{2} \times mv_1 + \frac{1}{2} \times mv_2 \qquad (39)$$

Similarly, in a case of a position displaced to the right by a distance of a ¾ pixel as shown in FIG. 9D, a motion vector $mv_{1'''}$ is calculated as shown in the following equation (40):

$$mv_{1'''} = \frac{1}{4} \times mv_1 + \frac{3}{4} \times mv_2 \qquad (40)$$

Thus, with the above processing, the inverse discrete cosine transform unit 33 subjects only low-frequency fourth-order coefficients of eighth-order discrete cosine coefficients to fourth-order inverse discrete cosine transform, and the discrete cosine transform unit 36 subjects 8×8 error correcting values of each block in a pixel domain generated by motion compensation based on the error data from the video memory 34 to fourth-order discrete cosine transform processing omitting high-frequency components in the horizontal direction, and thereby outputs error correcting values in a 4×8 frequency domain.

By using a fast algorithm for the fourth-order, inverse discrete cosine transform processing and discrete cosine transform processing on the horizontal low-frequency components, it is possible to further reduce the amount of processing. FIG. 10 illustrates a method based on a Wang's algorithm (Zhone de Wang., "Fast Algorithms for the Discrete W Transform and for the Discrete Fourier Transform," IEEE Tr. ASSP-32, No. 4, pp. 803–816, August 1984), which is an example of a fast algorithm. In FIG. 10, processing using F(0) to F(3) as an input value and f(0) to f(3) as an output value realizes an inverse discrete cosine transform, while processing using f(0) to f(3) as an input value and F(0) to F(3) as an output realizes a discrete cosine transform. In this case, operators A to D are defined as expressed by the following equations (41) to (44):

$$A = \frac{1}{\sqrt{2}} \qquad (41)$$

$$B = -\cos\left(\frac{\pi}{8}\right) + \cos\left(\frac{3\pi}{8}\right) \qquad (42)$$

$$C = \cos\left(\frac{\pi}{8}\right) + \cos\left(\frac{3\pi}{8}\right) \qquad (43)$$

$$D = \cos\left(\frac{3\pi}{8}\right) \qquad (44)$$

In performing the inverse discrete cosine transform, operations of the following equations (45) to (48) are performed:

$$f(0) = (F(0)+F(2)) \times A + F(1) \times C + (F(1)-F(3)) \times D \quad (45)$$

$$f(1) = (F(0)-F(2)) \times A + F(3) \times B - (F(1)-F(3)) \times D \quad (46)$$

$$f(2) = (F(0)-F(2)) \times A - F(3) \times B + (F(1)-F(3)) \times D \quad (47)$$

$$f(3) = (F(0)+F(2)) \times A - F(1) \times C - (F(1)-F(3)) \times D \quad (48)$$

In performing the discrete cosine transform, the inputs and the outputs are interchanged with each other, and the operations of the equations (45) to (48) are performed.

Figure 11:
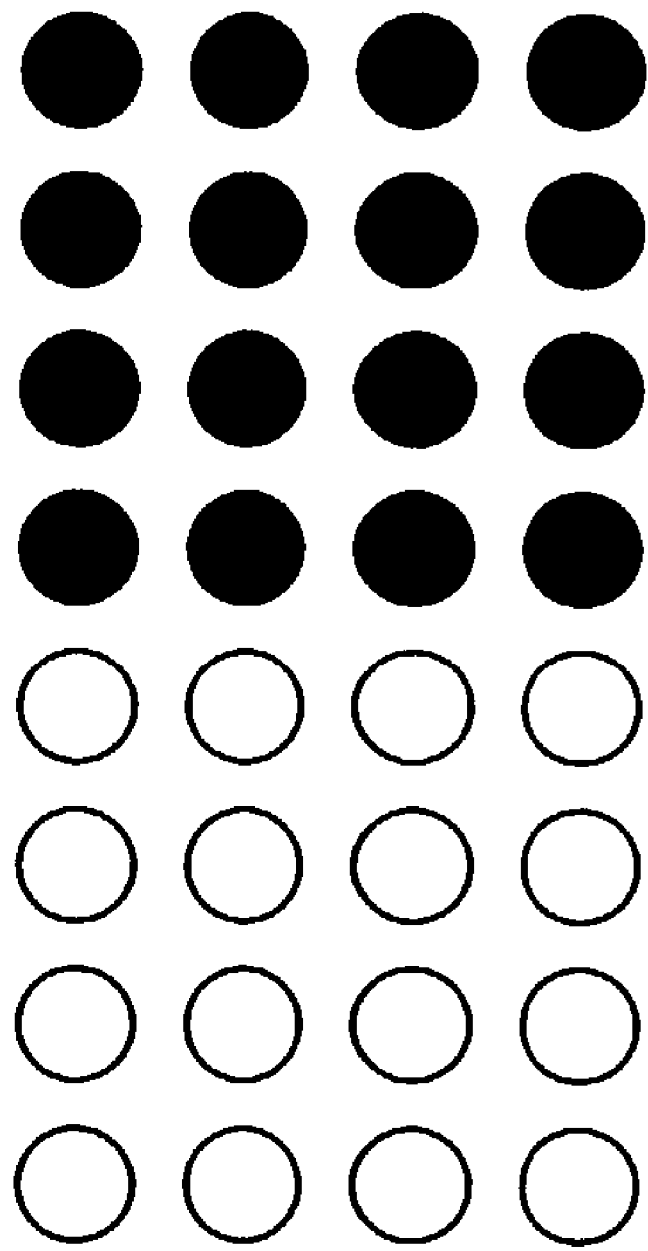
FIG. 11 is a diagram of assistance in explaining the processing for cutting high-frequency components.

It is known that, in general, degradation in a color-difference signal is less visible to the human eye than degradation in a luminescence signal. Thus, as shown in FIG. 11, the inverse discrete cosine transform unit 33 and the discrete cosine transform unit 36 may use, for correction, only low-frequency component coefficients in the vertical direction (for example, 4×4) of error correcting components of a color-difference signal of 4×8 error correcting signals, as mentioned above, and replace remaining high-frequency components with zero, thereby to reduce further the amount of computational processing involved in error correction and thus further reduce the amount of processing. In the figure, black circles indicate low-frequency components, and white circles indicate high-frequency components.

As described above, when calculating a quantization scale code in processing for converting the bit rate of compressed image information, it is not necessary to perform variance operations as expressed by the equations (22) to (24) on each pixel to obtain the normalized activity. Therefore, it is possible to reduce the amount of computational processing and thereby increase the processing speed.

The series of processing steps described above can be carried out not only by hardware but also by software. When the series of processing steps is to be carried out by software, a program forming the software is installed from a program storing medium onto a computer that is incorporated in special hardware or a general-purpose personal computer that can perform various functions by installing various programs thereon, for example.

FIG. 12 shows a configuration of an embodiment of a personal computer when the transcoder 1 is realized by software. A CPU 101 of the personal computer controls the entire operation of the personal computer. When a command is inputted from an input unit 106 formed by a keyboard, a mouse and the like by a user via a bus 104 and an input/output interface 105, the CPU 101 executes a program stored in a ROM (Read Only Memory) 102 in response to the command. Alternatively, the CPU 101 loads into a RAM (Random Access Memory) 103 a program that has been read from a magnetic disk 111, an optical disk 112, a magneto-optical disk 113, or a semiconductor memory 114 connected to a drive 110 and that has been installed in a memory unit 108, and then the CPU 101 executes the program. The functions of the above-described image processing apparatus 1 are thus realized by software. The CPU 101 also controls a communication unit 109 to communicate and exchange data with the outside.

As shown in FIG. 12, the program storing medium having a program recorded thereon is not only formed by packaged media distributed to users to provide the program separately from the computer, the packaged media being formed by the magnetic disk 111 (including a flexible disk), the optical disk 112 (including CD-ROM (Compact Disk-Read Only Memory), and DVD (Digital Versatile Disk)), the magneto-optical disk 113 (including MD (Mini-Disk)), the semiconductor memory 114 or the like having the program recorded thereon, but also is formed by the ROM 102, a hard disk included in the memory unit 108 or the like which has the program recorded thereon and is provided to the user in a state of being preincorporated in the computer.

It is to be noted that in the present specification, the steps describing the program recorded on the program storing medium include not only processing carried out in time series in the described order but also processing carried out in parallel or individually and not necessarily in time series.

The image processing apparatus and method and the program according to the present invention calculate a first quantization scale code required to code image data at a first bit rate on the basis of the image data coded at the first bit rate, calculate a second quantization scale code obtained by subjecting the first quantization scale code to adaptive quantization according to visual characteristics on the basis of the image data coded at the first bit rate, calculate a normalized activity on the basis of the first quantization scale code and the second quantization scale code, calculate a third quantization scale code required to code the image data at a second bit rate, and calculate a fourth quantization scale code obtained by subjecting the third quantization scale code to adaptive quantization according to visual characteristics on the basis of the third quantization scale code and the normalized activity. It is therefore possible to realize high-speed processing for converting image information compressed by an orthogonal transform and motion compensation and coded into image data with a lower bit rate.

While the preferred embodiments of the present invention have been described using specific terms, such description is for illustrative purposes only, and it is to be understood that changes and variations may be made without departing from the spirit or scope of the following claims.

What is claimed is:

1. An image processing apparatus for converting image data coded at a first bit rate into image data coded at a second bit rate, said image processing apparatus comprising:

first quantization scale code calculating means for calculating a first quantization scale code required to code said image data at said first bit rate on the basis of said image data coded at said first bit rate;

second quantization scale code calculating means for calculating a second quantization scale code obtained by subjecting said first quantization scale code to adaptive quantization according to visual characteristics on the basis of said image data coded at said first bit rate;

normalized activity calculating means for calculating a normalized activity on the basis of said first quantization scale code and said second quantization scale code;

third quantization scale code calculating means for calculating a third quantization scale code required to code said image data at said second bit rate;

fourth quantization scale code calculating means for calculating a fourth quantization scale code obtained by subjecting said third quantization scale code to adaptive quantization according to visual characteristics on the basis of said third quantization scale code and said normalized activity;

means for providing a determined quantization scale code from the second quantization scale code and the fourth quantization scale code; and means for using the determined quantization scale code to provide image data coded at the second bit rate.

2. An image processing apparatus as claimed in claim 1, wherein said second bit rate is lower than said first bit rate.

3. An image processing apparatus as claimed in claim 1, wherein said coded image data is image data compressed by an MPEG method.

4. An image processing apparatus as claimed in claim 1, wherein said image data coded at said first bit rate includes an amount of codes of said image data itself, an amount of bits generated in each frame, an amount of bits generated in each macroblock, and a quantization step size in each macroblock.

5. An image processing apparatus as claimed in claim 4, wherein said first quantization scale code calculating means calculates said first quantization scale code on the basis of said amount of codes, said amount of bits generated in each frame, and said amount of bits generated in each macroblock.

6. An image processing apparatus as claimed in claim 4, wherein said second quantization scale code calculating means calculates said second quantization scale code obtained by subjecting said first quantization scale code to adaptive quantization according to visual characteristics by dividing said quantization step size in each macroblock by 2.

7. An image processing apparatus as claimed in claim 1, wherein said normalized activity calculating means calculates said normalized activity by dividing said second quantization scale code by said first quantization scale code.

8. The apparatus of claim 1, wherein the determined quantization scale code is the fourth quantization scale code where the second quantization scale code is greater than the fourth quantization scale code, and is the second quantization scale code where the second quantization scale code is not greater than the fourth quantization scale code.

9. An image processing method of an image processing apparatus, said image processing apparatus converting image data coded at a first bit rate into image data coded at a second bit rate, said image processing method comprising:
 a first quantization scale code calculating step for calculating a first quantization scale code required to code said image data at said first bit rate on the basis of said image data coded at said first bit rate;
 a second quantization scale code calculating step for calculating a second quantization scale code obtained by subjecting said first quantization scale code to adaptive quantization according to visual characteristics on the basis of said image data coded at said first bit rate;
 a normalized activity calculating step for calculating a normalized activity on the basis of said first quantization scale code and said second quantization scale code;
 a third quantization scale code calculating step for calculating a third quantization scale code required to code said image data at said second bit rate;
 a fourth quantization scale code calculating step for calculating a fourth quantization scale code obtained by subjecting said third quantization scale code to adaptive quantization according to visual characteristics on the basis of said third quantization scale code and said normalized activity;
 providing a determined quantization scale code from the second quantization scale code and the fourth quantization scale code; and
 using the determined quantization scale code to provide image data coded at the second bit rate.

10. The method of claim 9, wherein the determined quantization scale code is the fourth quantization scale code where the second quantization scale code is greater than the fourth quantization scale code, and is the second quantization scale code where the second quantization scale code is not greater than the fourth quantization scale code.

11. A recording medium on which a computer readable program for controlling an image processing apparatus is recorded, said image processing apparatus converting image data coded at a first bit rate into image data coded at a second bit rate, said program including:
 a first quantization scale code calculation control step for controlling calculation of a first quantization scale code required to code said image data at said first bit rate on the basis of said image data coded at said first bit rate;
 a second quantization scale code calculation control step for controlling calculation of a second quantization scale code obtained by subjecting said first quantization scale code to adaptive quantization according to visual characteristics on the basis of said image data coded at said first bit rate;
 a normalized activity calculation control step for controlling calculation of a normalized activity on the basis of said first quantization scale code and said second quantization scale code;
 a third quantization scale code calculation control step for controlling calculation of a third quantization scale code required to code said image data at said second bit rate;
 a fourth quantization scale code calculation control step for controlling calculation of a fourth quantization scale code obtained by subjecting said third quantization scale code to adaptive quantization according to visual characteristics on the basis of said third quantization scale code and said normalized activity;
 providing a determined quantization scale code from the second quantization scale code and the fourth quantization scale code; and
 using the determined quantization scale code to provide image data coded at the second bit rate.

12. A transcoder apparatus for converting image data coded at a first bit rate into image data coded at a second bit rate, said program comprising:
 a normalized activity calculating unit, which controls calculation of a first quantization scale code required to code said image data at said first bit rate on the basis of said image data coded at said first bit rate, calculation of a second quantization scale code obtained by subjecting said first quantization scale code to adaptive quantization according to visual characteristics on the basis of said image data coded at said first bit rate, and calculation of a normalized activity on the basis of said first quantization scale code and said second quantization scale code;
 a code amount control unit, in operative communication with the normalized activity calculating unit, which controls calculation of a third quantization scale code required to code said image data at said second bit rate, and calculation of a fourth quantization scale code obtained by subjecting said third quantization scale code to adaptive quantization according to visual characteristics on the basis of said third quantization scale code and said normalized activity, wherein the code amount control unit provides a determined quantization scale code from the second quantization scale code and the fourth quantization scale code; and means for using the determined quantization scale code to provide image data coded at the second bit rate.

13. The transcoder apparatus of claim 12, wherein the determined quantization scale code is the fourth quantization scale code where the second quantization scale code is greater than the fourth quantization scale code, and is the second quantization scale code where the second quantization scale code is not greater than the fourth quantization scale code.

* * * * *